United States Patent [19]

Yamagami et al.

[11] Patent Number: 4,800,549

[45] Date of Patent: Jan. 24, 1989

[54] METHOD AND APPARATUS FOR SEEKING TARGET ADDRESS WITH ERROR CHECK CODE

[75] Inventors: Tamotsu Yamagami, Kanagawa; Yoichiro Sako, Tokyo, both of Japan

[73] Assignee: Sony Corporation, Tokyo, Japan

[21] Appl. No.: 47,699

[22] Filed: May 6, 1987

[30] Foreign Application Priority Data

May 31, 1986 [JP] Japan ................................ 61-126005
May 31, 1986 [JP] Japan ................................ 61-126006

[51] Int. Cl.$^4$ ......................... G11B 7/00; G11B 21/00
[52] U.S. Cl. ........................................ 369/56; 369/57; 369/59; 369/33; 360/72.1
[58] Field of Search ............... 358/342, 907; 360/72.1, 360/72.2, 77, 78; 369/33, 43, 44, 47, 48, 56, 54, 57

[56] References Cited

U.S. PATENT DOCUMENTS

4,199,820  4/1980  Ohtake et al. ................... 360/78 X

*Primary Examiner*—Robert L. Richardson
*Attorney, Agent, or Firm*—Philip M. Shaw, Jr.

[57] ABSTRACT

A method and an apparatus for seeking a target address having an appended error check code are disclosed. According to the invention, when seeking a target address on a record medium on which the recorded data are divided into plural blocks in correlation with an address for each block and an error check code for each address, the error check code to be appended to the address is formed from the target address. The target address and the error check code derived from the target address are compared to the address having the error check code reproduced from the record medium. When the result of such comparison has revealed that the error is within the symbol or bit number that can be corrected by the error check code, the address read from the record medium is determined to be the target address.

13 Claims, 5 Drawing Sheets

METHOD AND APPARATUS FOR SEEKING TARGET ADDRESS WITH ERROR CHECK CODE

BACKGROUND OF THE INVENTION

1. Field of the Invention

This invention relates to a method and an apparatus for seeing a desired target address on a record medium, such as an optical disk or an optical card, on which the recorded data are divided into plural data blocks.

2. Description of the Prior Art

On an optical recording medium in the form of a disk, such as an optical disk or an opto-magnetic disk, spiral or concentric tracks are formed, with each track being divided into a plurality of sectors. On an optical recording medium in the form of a card, such as an optical card, each band-like record area is divided into plural record tracks. At the prescribed position in the recording block, such as at each sector or each recording track, there are formed identification signals, including error detection codes such as sync patterns, addresses or cyclic redundancy check codes (CRC), as a result of pre-formatting by the card or disk supplier or formatting preceding the start of use of the new disk. It is by the address information included in the identification signals that a random access can be made to the recorded data on the record medium.

The identification part of each block or sector in which are recorded these identification signals is also termed the ID part or the address part in the broad sense of the term. In the case of certain optical disks, for example, there are multiply written, for example three times, a unit of the identification information formed of: an address consisting of a track address, a sector address and an error detection code (EDC) for detecting address errors.

It has also been proposed in regard to, for example, optical disks that the cyclic redundancy check code be replaced by an error correction code in order to deal with the higher error rates associated with optical disks. When accessing a prescribed sector on such a disk for signal recording or reproduction, the pickup head movement is controlled while checking the current address through reproducing the identification signals. In reproducing the address, a decoding operation such as the aforementioned error detection or correction operation is executed. This results in a complicated decoding process for error checking at the time of address reading or reproduction. Above all, when the information unit is formed by multiple recording or writing, it becomes necessary to determine the address by using, for example, a majority logic procedure after error detection or correction of each information unit, with a resulting complication of the hardware or the decoding algorithm and prolonged computing time, thus presenting difficulties in achieving high speed accessing.

OBJECT AND SUMMARY OF THE INVENTION

It is an object of the present invention to provide for address seeking with improved reliability by forming an error check code providing an error correction capability and by having said error check code appended to the address.

It is another object of the present invention to provide for high speed operation in checking that the address reproduced from the record medium is the target address.

It is a further object of the present invention to simplify the hardware of the circuit which checks that the address reproduced from the record medium is the target address.

In accordance with the method and apparatus of the present invention, the data to be recorded are divided into plural blocks in correlation with an address for each block and an error check code for each address. When seeking the target address at the time of reproduction, the error check code to be appended to the target address is formed from the target address. The target address and the error check code are then compared with the address and the error check code which are read from the record medium. When it has become clear by such comparison that the error is within the range of the symbol or bit number that can be corrected by the error check code, the address read from the record medium is determined to be the target address.

DESCRIPTION OF THE PREFERRED EMBODIMENTS

Figure 1:
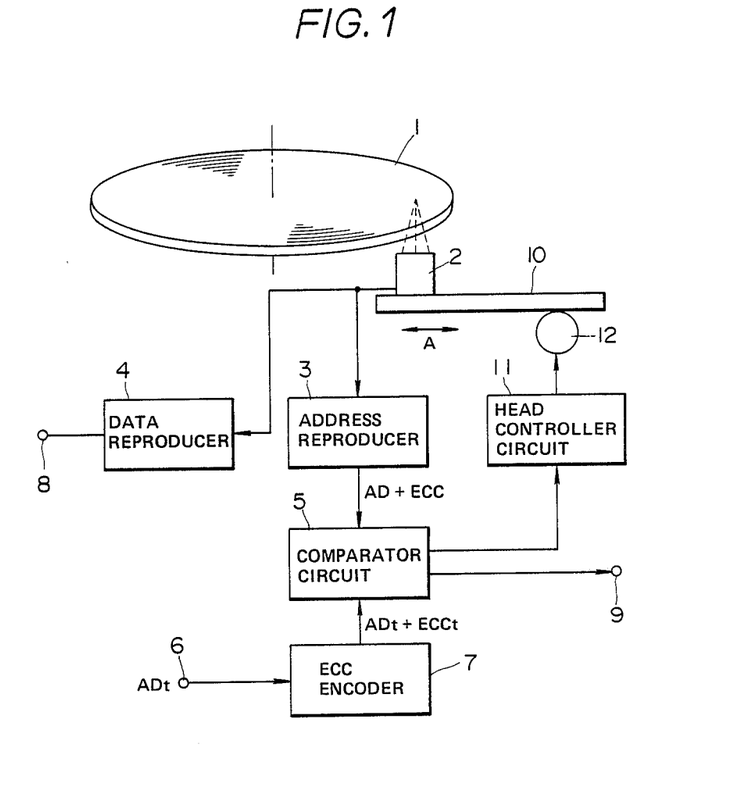
FIG. 1 is a block diagram showing essential parts of an optical disk drive for explaining a first embodiment of the present invention.

FIG. 1 illustrates a method for accessing the data block based on address seeking in accordance with an embodiment of the present invention. Referring to FIG. 1, signals are recorded on or reproduced from an optical disk 1, as an example of the recording medium, by an optical pickup head 2. The signals from the optical pickup head 2 are supplied to an address reading or reproducer circuit 3 where the address of the block or sector currently reproduced is read and the thus read address signals are sent to a comparator circuit 5. These signals from the pickup head are also supplied to a data reproducer 4 so that data reproduced from the optical disk 1 are supplied to an output terminal 8.

Figure 2:
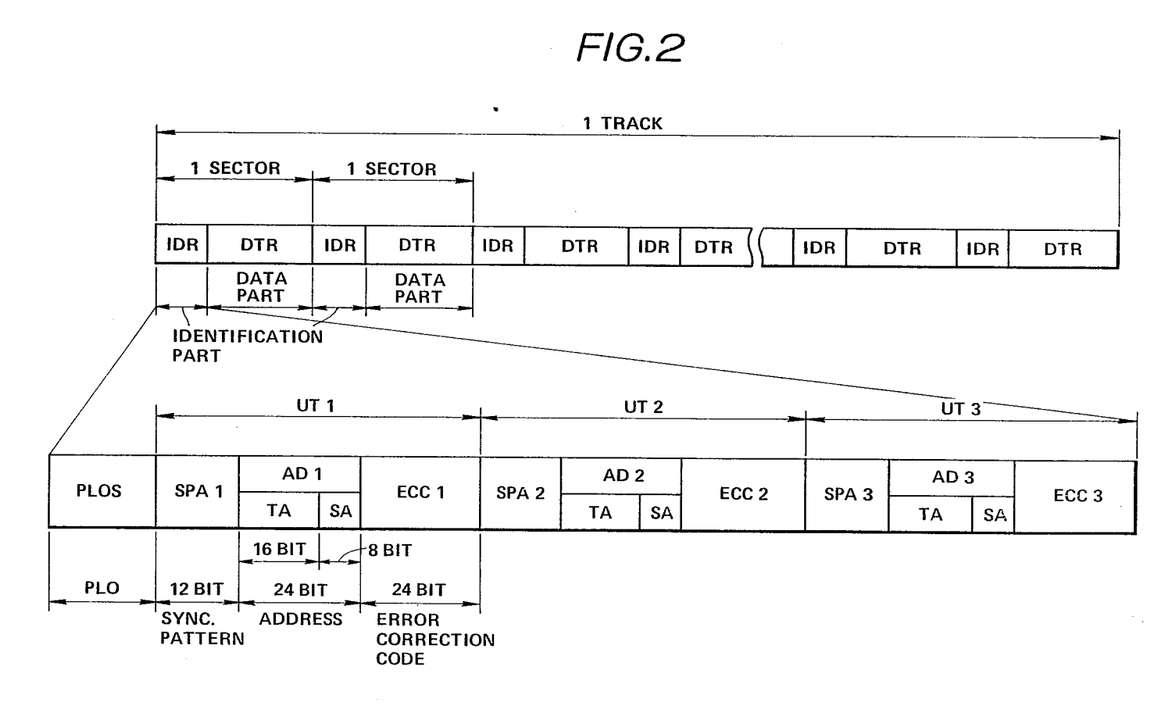
FIG. 2 shows an example of the recording format for signals recorded on the optical disk.

An example of a proposed signal recording format for each block or sector on the optical disk 1 is shown in FIG. 2. In this figure, a track on the optical disk 1 and an enlarged sector identification part or ID part are shown highly schematically. Each track consists of plural sectors, with each sector consisting in turn of a pre-formatted identification part IDR and a data part DTR for recording the sector data. At the head of the identification part IDR is a sync signal PLOS for controlling the operation of a PLL (phase locked loop) circuit for producing clock signals at the time of data reading. Contiguous to this sync signal PLOS is a sector in which identifying address information UT is written three times in succession. Thus, three units UT1, UT2 and UT3 are arranged in this order contiguous to the sync signal PLOS so as to be used as the recording units of the sector identifying address information. Each unit UT1 to UT3 is formed by a leading sync pattern address mark SPA, an address AD consisting of a track address TA and a sector address SA and an error correction code ECC, consisting, for example of BCH codes, as address error check codes. As an example, the track address TA is formed by 16 bits while the sector address SA is formed by 8 bits, so that the address is formed by a sum total of 24 bits. The length of the error correction code ECC is equal to the sum of the address data bits and thus is set to 24 bits.

When recording or reproducing data signals on or from the optical disk 1 having the aforementioned recording format for each sector or block, under control of, for example, a host computer, it becomes necessary to access the block or sector of the target address desired to be recorded or reproduced. In accessing the sector or block of the target address, it has been customary to read the identification part IDR of each sector to produce the address data. In this case, the addresses AD of the units UT1 to UT3 are subjected to error detection or correction processing by using the error detecting code (EDC) or error correcting code (ECC) and the resulting address data are compared to one another. When these address data are not coincident with one another, the address data showing the maximum degree of coincidence, when relying for example on a majority logic scheme, are adopted as the valid address. For example, if the address data are formed by triple writing, the address data represented by two coincident data are adopted. This valid address is compared to the target address so that the pickup head is controlled to be shifted towards the block indicated by the target address. However, in such method, the current address cannot be determined until the totality of the addresses of the multiple units have been decoded for error checking. In addition, a continuous operation of time-consuming decoding is required, while the hardware load is also increased.

In the present invention, the address error checking is performed by encoding the error check code based on the target address in lieu of decoding the target address data based on the error check code. According to a first embodiment of the present invention, shown in FIG. 1, a target address $AD_t$ supplied through an input terminal 6 from a host computer (not shown), for example, to the optical disk device is supplied to an error correcting code (ECC) encoder 7 where the error correction code $ECC_t$ is appended to this address as the error check code. The set comprised of the target address $AD_t$ and the error correction code $ECC_t$ are supplied to a comparator circuit 5 for simple or bitwise comparison with the set comprised of the address and the error correction code included in the reproduced signal obtained at the address reproducer 3. If the two sets are coincident within a prescribed allowable range, that is, the symbol or bit error is within the error correction capability of the error correcting code, then the reproduced address is determined to be the target address so that a coincidence output is supplied to the output terminal 9. The manner in which this coincidence output is used to control the accessing operation will be explained further herein.

Figure 3:
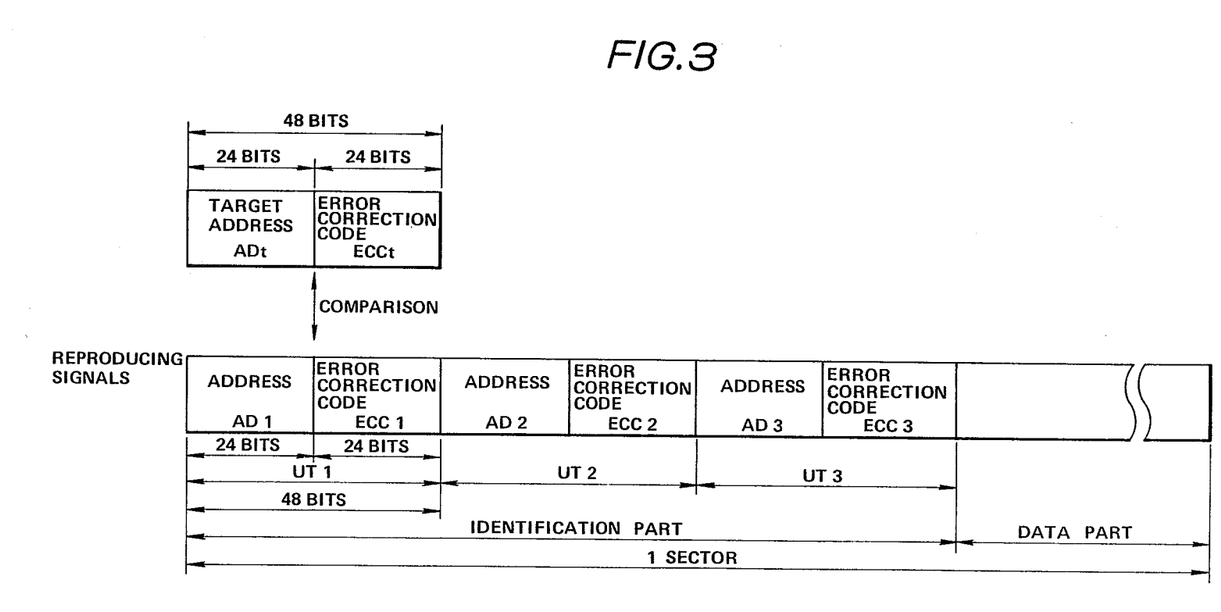
FIG. 3 illustrates an error check operation performed in accordance with the present invention.

FIG. 3 is an example of the reproduced signal obtained upon reproduction of the signals recorded on the disk 1 in which the 24 bit addresses and 24 bit error correction codes (ECC) as the error check codes, for example, are formed by triple writing or recording, similarly to the recording format of FIG. 2. Referring to FIG. 3, the sets of the addresses and the error check codes making up the units UTI, UT2 and UT3 formed by triple writing or recording are reproduced in the chronological order of AD1, ECC1, AD2, ECC2, AD3 and ECC3.

During the simple or bitwise comparison operation, the first step is to compare the set of AD1 and ECC with the set of the target address $ADt$ and error correction code $ECC_t$. The comparison operation at this point is a simple or bit-by-bit comparison. Thus, when a bits out of the total of 48 bits formed of the 24 address bits and the 24 error correction code bits are faulty or in error, with the number a being four, as an example, which is within the error correction capability of the error correction code, the block or sector corresponding to the address currently reproduced is determined to be the block corresponding to the aforementioned target block ADt. Thus the target address seeking operation is controlled by judging whether the number of the faulty bits is coincident with or lesser than the aforementioned bit number a which is set as the allowable range or threshold value.

It will be noted that when a coincidence within the allowable range has been ascertained to exist at the time the first unit UT1, of the three units formed by triple recording as described above, has been reproduced, then this address can be assumed to be the target address and thus it is not necessary to conduct a comparison of the remaining two units UT2 and UT3. Similarly, when the aforementioned coincidence is not ascertained to exist in the first unit UT1 but is ascertained to exist in the second unit UT2, then the bitwise comparison can be terminated without regard to the remaining third unit UT3.

For the aforementioned error correction code ECC, a (48, 24) enlarged BHC code formed by 24 bits can be employed. Since this code system has a minimum distance between the codes of 12 and an error correction capability of 5 bits, an error of $\leq 4$ bits can be completely corrected. Thus the reproduced address has been made coincident with the aforementioned target address by the seeking process when the symbol or bit error caused by bitwise comparison is within a $\leq 4$ bits. In this way the decoding operation which usually needs a complex algorithm and entails additional hardware may be omitted since it is possible to ascertain the reproduced address and access the desired block or sector by performing a decode operation using simpler hardware without impairing the operational reliability. It will be noted that an error correction code such as a Reed Solomon code may also be used in place of the aforementioned BCH code.

It is also possible to use an allowable range or threshold of error for checking the coincidence of the read or reproduced signals that is different from that for checking the coincidence of the written or recorded signals. For example, with a threshold a for the reproduced or read signals, a threshold b for the recorded or written signals can be selected to be lesser than the threshold a (b<a). This means that a narrower allowable range is used with more stringent coincidence conditions at the time of signal recording than at the time of signal reading or reproduction.

It is to be noted in this connection that, at the time of signal reading, since the data have been previously written, the demand is to read the data at any rate despite increased reading difficulties. On the other hand, during signal recording, it is advisable not to write data in a less desirable block or sector where the address is possibly difficult to read so that the data once written can be read later positively. When using a (48, 24) enlarged BCH code, the preferred threshold values are a=4 and b=1.

For further improving the operational reliability, the address currently reproduced may be determined to be the aforementioned target address only when a comparison difference within the threshold value a has been ascertained for the reproduced signals of at least k units of a total of n units formed by n-times recording or writing. In this case, it is unnecessary to wait until all of the n units are reproduced, but the address currently reproduced can be instantly determined to be the aforementioned target address at the time the coincidence has been ascertained for the sequentially reproduced k units.

It will be noted that the shifting of the optical pickup head 2 until reaching the target address can be conventionally controlled. For example, the difference between the read address value from the address reading circuit 3 and the target address value is determined by the comparator 5 and a head driving actuator 12 is driven through a head driving control circuit 11 as a function of the difference so that the optical pickup head 2 is moved through a head supporting plate 10 radially across the disk or in the direction shown by the arrow mark A so that the difference between the reproduced address and the target address will become zero or a predetermined value. The address reading circuit 3 can be designed so that the address of the currently reproduced sector next to a preceding sector on the optical disk 1 is estimated by, for example, incrementing by "1" the reference address read from and determined for the preceding sector, the thus estimated address is compared with the actually reproduced address and the latter is outputted as the desired address when the compared addresses coincide with each other. As an alternative, such an address reading circuit 3 may be employed in which the aforementioned estimated address is previously encoded and the thus encoded signal is compared with the reproduced address with an appended error check code and, when the symbol or bit error is within a prescribed tolerable range, the estimated address is recognized to be the desired address.

Figure 4:
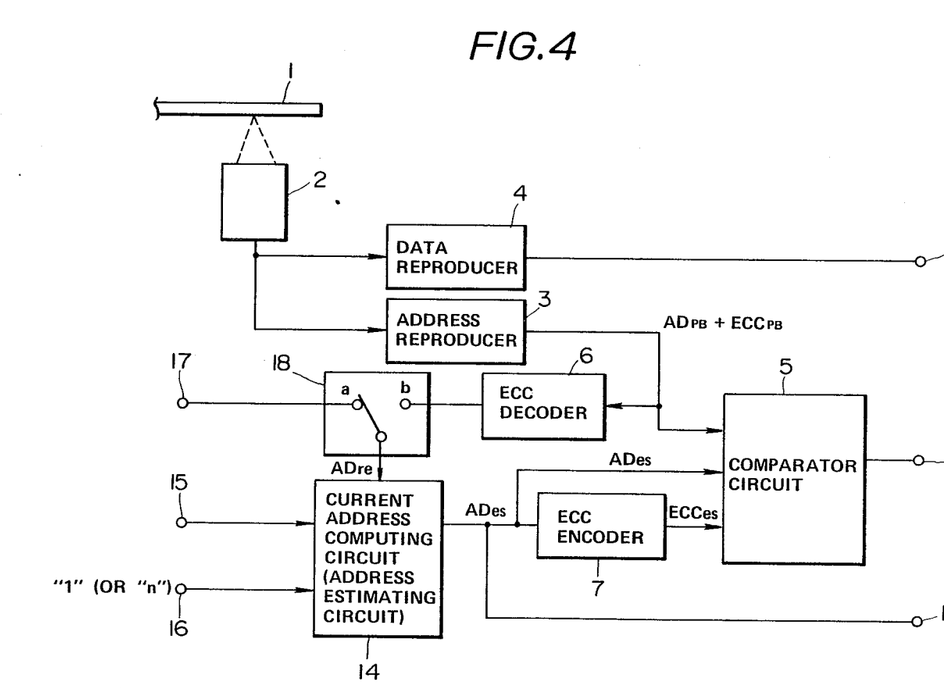
FIG. 4 is a block diagram showing essential parts of an optical disk drive for explaining a further embodiment of the present invention.

The method of seeking the target address based on the reference address will now be explained. FIG. 4 is a block diagram showing the apparatus for address seeking in accordance with a modified embodiment of the present invention. In this figure, the parts corresponding to those shown in FIG. 1 are indicated by the same reference numerals. The signals can be reproduced by an optical pickup head 2 from the optical disk 1, as an example of the recording medium. The signals from the optical pickup head 2 are supplied to the data reproducer 4 so that the data recorded on the optical disk are outputted at the output terminal 8. The signals from the head 2 are also supplied to the address reproducer 3 to be turned into corresponding digital signals. The identification part of the thus read digital signals (playback address $AD_{PB}$ and correction code $ECC_{PB}$) is supplied to the comparator circuit 5. To this comparator circuit 5, there are also supplied the address of the block or sector that has been estimated by an arithmetic operation based on the fixed reference address $AD_{re}$ previously read from the disk 1, and an error correction code $ECC_{es}$ obtained upon encoding or error correction coding of the estimated address $AD_{es}$ by an ECC encoder 7.

As will be explained in greater detail in this description, the address of the sector to be sought by the optical pickup head 2 is estimated by an arithmetic operation carried out in a current address computing circuit 14 on the basis of the sector address $AD_{re}$ previously read from the optical disk 1 and determined to be valid. The estimated address $AD_{es}$ to be sought is subjected to encoding to find the error correction code $ECC_{es}$. The set of the estimated address $AD_{es}$ and the code $ECC_{es}$ are compared bit-by-bit with the set of the playback address $AD_{PB}$ and the correction codes $ECC_{PB}$ obtained upon actual reproduction. When the symbol or bit error is within a prescribed range of the error correction capability of this error correcting code ECC, the address is determined to be valid.

Figure 5:
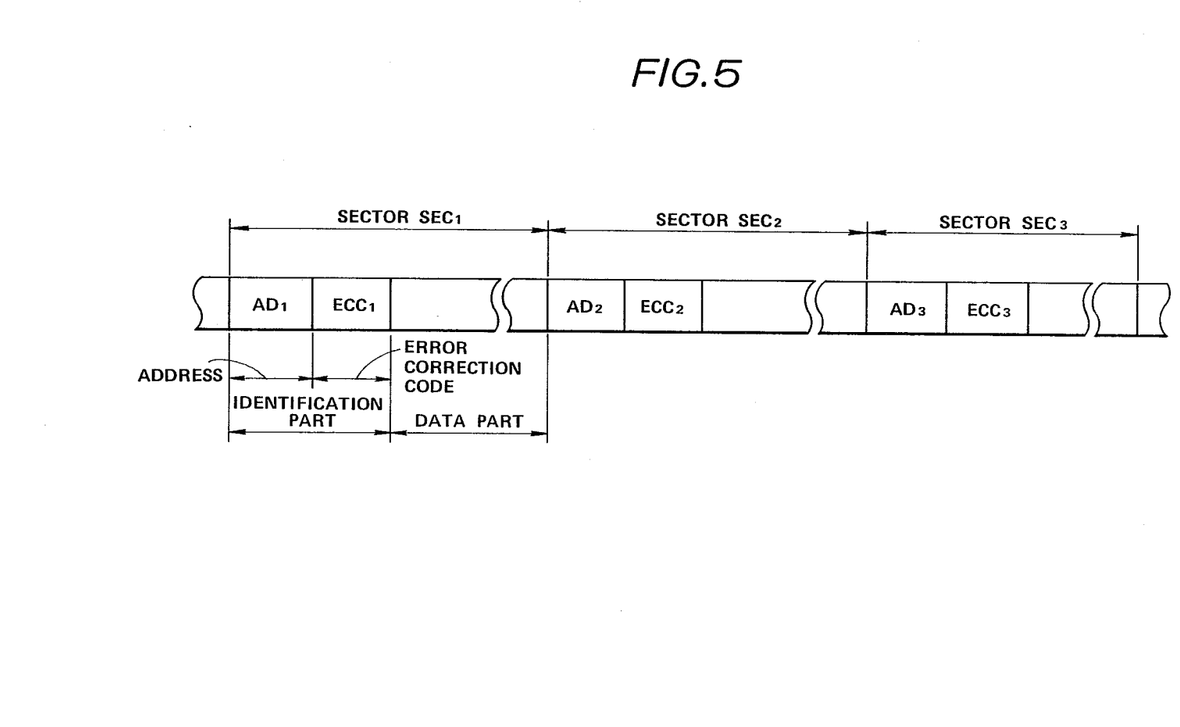
FIG. 5 shows a recording format for the optical disk, used in the explanation of FIG. 4.

A description will now be given referring to FIGS. 4 and 5. FIG. 5 shows plural sectors SEC1, SEC2, SEC3 contiguously formed on the optical disk 1. The addresses of these sectors SECI, SEC2, SEC3, ... are indicated by AD1, AD2, AD3, ... while the corresponding error correction codes are indicated by ECC1, ECC2, ECC3, ... Although the sector addresses and the corresponding error correction codes are shown to be formed only once for simplicity, they may also be formed by multiple recording, that is, they may be written a prescribed number of times, as shown in FIG. 3. The error correction codes may also be replaced by an error detection code.

Turning now to the aforementioned reference address $AD_{re}$, an address of a desired sector, such as an address $AD_1$ of the section SEC1 shown in FIG. 5, is read by the address reader 3 shown in FIG. 4. This address is decoded by an ECC decoder 6 using the error correction code $ECC_1$ to find a reference address $AD_{re}$ having a higher reliability. This reference address is outputted from the decoder 6 and is transmitted to a current address computing circuit (actually an address estimating circuit) 14 through a select terminal b of a changeover switch 18. Then, when reproducing the address of the sector SEC2 next to or contiguous to the sector SEC2, the address of the sector SEC2 to be sought is computed or estimated on the basis of the reference address $AD_{re}$ in the address computing circuit 14 by the arithmetic operation of $AD_{re}+1$. The thus estimated address is then supplied to the ECC encoder 7 where it is subjected to error correction coding or encoding to derive the error correction code $ECC_{es}$ to be appended to the estimated address. The set of the estimated current address $AD_{es}$ ($=AD_{re}+1$) and the code $ECC_{es}$ are compared in the comparator 5 to the set of the current address $AD_2$ obtained on actual reproduction and the error correction code $ECC_2$. When these two sets of the addresses and codes are coincident within a prescribed range of the error correction capability of the error correction code, the comparator 5 issues a coincidence signal at an output terminal 9. In accordance with the coincidence output signal, the address output signal is issued as a valid address via a terminal 13 from the address computing circuit 14. The valid address output signal from the output terminal 13 is transmitted through, for example, an input terminal 17 to a select terminal a of the changeover switch 18, so as to be transmitted to the current address computing circuit 14 as the aforementioned reference address to be used for seeking the next sector address.

The arithmetic operation to be performed for address estimation in the address computing circuit 14 will now be explained. When the continuous sector data are sequentially reproduced sector by sector by address seeking as described above, the estimated address $AD_{es}$ can be computed by adding an addition data "1" from the input terminal 16 to the reference address $AD_{re}$ each time a sector count signal based on the disk rotation detection pulses or sector sync pulses obtained from the optical pickup head is supplied to the input terminal 15. When the address signals are to be reproduced at intervals of two or more sectors, such as n sectors, the addition data to be supplied to the input terminal 16 is set to "n" and the additive operation is performed each time D sectors are counted so that the estimated address will be transmitted to the comparator 5.

The comparison operation to be performed in the comparator 5 may for example be a bit-by-bit comparison to find the number of the faulty symbols or bits. In case the address part is composed of 24 bits and the error correction code part is composed of 24 bits, the sum total of the bits being thus 48, and the number of faulty bits or symbols is not more than a (for example, a=4), the block or sector that is currently reproduced is determined to be the block of the target address $AD_t$. In other words, a check is made of whether the aforementioned faulty bit or symbol number is within the allowable range or threshold value in order to check for possible address coincidence. In this manner, the reproduced address can be checked at high speed and with a high operational reliability compared to a conventional decode processing operation that requires in general a complicated algorithm and entails an increased hardware load.

Although the present invention has been shown and described with respect to preferred embodiments, various changes and modifications which are obvious to a person skilled in the art to which the invention pertains are deemed to lie within the spirit and scope of the invention.

What is claimed is:

1. A method for seeking a target address on a record medium on which has been recorded data divided into plural blocks in correlation with an address for each block and an error check code which is encoded based on each address, said method comprising the steps of
   a. forming from a supplied target address an error check code to be appended to said target address;
   b. reading data recording on the medium and extracting the address therefor with the corresponding error check code;
   c. comparing said target address and the error check code formed therefrom with said extracted address and corresponding error check code; and
   d. repeating steps (b) and (c) until the comparison in step (c) indicates that the error between the target address and the extracted address is less than a predetermined number and then designating the currently extracted address to be the target address.

2. A method according to claim 1 wherein in step (b) the data is read optically from said record medium.

3. A method according to claim 1 wherein said error check code is a BCH code.

4. A method according to claim 1 wherein said error check code is a Reed Solomon code.

5. A method according to claim 1 wherein said predetermined number is the number of bits which are correctable by the error check code.

6. A method for seeking a target address on a record medium on which are recorded data divided into plural blocks in correlation with an address for each block and an error check code which is encoded based on each address, said method comprising the steps of:
   a. reproducing the signals recorded on said record medium and extracting the addresses from the reproduced signals;
   b. computing a target address based on the extracted address;
   c. forming from the computed target address an error check code to be appended to said target address;
   d. comparing said target address and error check code with the extracted, reproduced address and error check code therefor; and
   e. repeating steps (a) to (d) until the comparison in step (d) indicates that the error between the target address and the extracted address is less than a predetermined number and then designating the currently extracted address to be the target address.

7. A method according to claim 6 wherein in said signal reproducing step the signals are read optically from said record medium.

8. A method according to claim 6 wherein said predetermined number in the comparison step is equal to or less than the error correction capability of said error check code.

9. A method according to claims 1 or 6 wherein said data blocks are recorded on said record medium along with corresponding addresses and error check codes recorded a multiple number (n) times for each block and further wherein in said comparing step at least a number k of said extracted, multiply recorded addresses and error codes, where k<n, are compared with said target address and error check code therefor.

10. A target address seeking apparatus for use with a signal reproducing means for reproducing signals recorded on a record medium on which recorded data are divided into plural blocks in correlation with an address for each block and an error check code which is encoded based on each address, said target address seeking apparatus comprising:
   a. means for forming from a supplied target address an error check code to be appended to said target address;
   b. means for extracting an address having an error check code from the output signals of said signal reproducing means;
   c. means for comparing said target address and the error check code formed from said target address with said extracted address and said extracted error check code; and
   d. means for controlling the operation of said signal reproducing means on the basis of the results of the comparison by said comparing means.

11. A target address seeking apparatus for use with a signal reproducing means for reproducing signals recorded on a record medium on which r Ⓡcorded data are divided into plural blocks in correlation with an address for each block and an error check code for each address, said target address seeking apparatus comprising:
   (a) means for extracting the recorded addresses and error codes from the output signals of said signal reproducing means;
   (b) means for computing a target address based on the extracted address;

(c) means for forming from the computed target address an error check code to be appended to said computed target address;
(d) comparing said computed target address and the error check code therefor with the extracted address and the error check code therefor; and
(e) means for controlling the operation of said signal reproducing means based on the results of the comparison by said comparison means.

12. An apparatus according to claims 10 or 11 wherein said comparing means generates an accessing drive signal for driving said signal reproducing means and supplies it to said controlling means to seek the next address when the comparing means determines that the difference between said target address and the error check code derived therefor and the extracted address and error check therefor exceeds the error correction capability of said error code.

13. An apparatus according to claims 10 or 11 wherein said data blocks are recorded on said record medium along with corresponding addresses and error check codes recorded a multiple number (n) times for each block and further wherein said comparing means performs said comparison for at least a number k of said extracted, multiply recorded addresses and error codes where $k < n$.

* * * * *